United States Patent [19]

Ziegler

[11] Patent Number: 4,508,747

[45] Date of Patent: Apr. 2, 1985

[54] AROMATIC CITRUS OIL CONCENTRATE WHICH IS STABLE IN STORAGE

[76] Inventor: Erich Ziegler, Draisendorfer Strasse 143, D-8551 Aufsess, Fed. Rep. of Germany

[21] Appl. No.: 539,672

[22] Filed: Oct. 6, 1983

Related U.S. Application Data

[62] Division of Ser. No. 362,893, Mar. 26, 1982, Pat. No. 4,435,437.

[30] Foreign Application Priority Data

Mar. 28, 1981 [DE] Fed. Rep. of Germany ....... 3112380

[51] Int. Cl.$^3$ .......................... A23L 1/221; A23L 1/28
[52] U.S. Cl. ..................................... 426/651; 426/655; 426/387; 426/424; 426/429
[58] Field of Search ............... 426/651, 655, 429, 387, 426/424

[56] References Cited

U.S. PATENT DOCUMENTS

| | | | |
|---|---|---|---|
| 2,712,008 | 6/1955 | Kirchner et al. | 426/651 X |
| 2,754,215 | 7/1956 | Evans et al. | |
| 3,118,776 | 1/1964 | Byer et al. | 426/651 X |
| 3,120,442 | 2/1964 | Ostrus | 426/651 X |
| 3,294,550 | 12/1966 | Ikeda et al. | 426/651 |
| 3,300,320 | 1/1967 | Distelkamp et al. | 426/490 |
| 3,353,961 | 11/1967 | Simon | |
| 3,782,972 | 1/1974 | Atkins et al. | 426/651 X |
| 3,917,865 | 11/1975 | Shaw et al. | 426/424 |

FOREIGN PATENT DOCUMENTS 549252 7/1956 Belgium .

OTHER PUBLICATIONS

Crocker et al, "Improved Encapsulated Citrus Oils", *Food Technology*, vol. 32, pp. 36, 38 and 39, 1978.
Gunter, H. O. et al, "Formation of Artifacts During Thin Layer Chromatography of Furocoumarines of Citrus Oils", excerpt from: Essence Derived From Citrus Fruits, No. 4, 1977, pp. 473-484.
Ziegler, E., "The Examination of Citrus Oils", The Flavour Industry, Nov. 1971, pp. 647-653.
Ziegler, "Zur Beurteilung von Zitrusolen", in translation, For the Evaluation of Citrus Oils, *Deutsche Lebensmittel-Rundschau*, in translation, *German Foodstuffs Review*, vol. 66, No. 9, 1970, pp. 290-296.
Brandauer et al, "Prufung von Gas-Chromatographiegeraten fur Betriebs-und Entwicklungsanalysen von Aromen, atherischen Olen und Parfumolen", in translation, Examination of Gas Chromatograph Devices for Business and Development Analysis of Aroma, Atheric Oils and Perfume Oils, *Parfumerie und Kosmetik*, in translation *Perfumes and Cosmetics*, 54, 1973, pp. 1-5.
Ziegler et al, "Glas-Oder Metallsaule? Routineanalytik von Citrusolen durch Gas-Chromatographie", in translation, Glass or Metal Columns? Routine Analysis of Citrus Oils by Gas Chromatography, *Chromatographia*, in translation, *Chromatograph*, 4, 1971, pp. 524-530.
Deuber et al, "Trennung von Naturstoffen unter Verwendung der Gelpermeationstrennung oder einer Vorsaule, speziell fur die Analytik der Kapillar-Gaschromatographie", in translation, Separation of Natural Substances Usine Pre-separation by a Pre-column, Specifically for Analysis of the Capillary Gas Chromatography, *Chromatographia*, in translation, *Chromatography*, vol. 12, Nov. 1979, pp. 717-739.

*Primary Examiner*—Robert Yoncoskie
*Attorney, Agent, or Firm*—Spencer & Frank

[57] ABSTRACT

Peel oil concentrate produced from cold-pressed citrus peel by adsorption at a solid separating agent which adsorbs polar organic substances or by extraction with a polar liquid solvent. The peel oil concentrate is a stabilizing agent for a natural citrus aroma concentrates.

4 Claims, No Drawings

AROMATIC CITRUS OIL CONCENTRATE WHICH IS STABLE IN STORAGE

CROSS REFERENCE TO RELATED APPLICATION

This application is a divisional application of Ser. No. 362,893 filed on Mar. 26, 1982, now U.S. Pat. No. 4,435,437.

BACKGROUND OF THE INVENTION

The present invention relates to concentrates from natural citrus oils which are used to improve the taste and flavour of natural fruit juices and fruit drinks made of citrus fruits.

Substances originating from natural fruits and applicable for the above-stated uses are obtained during processing of most freshly harvested fruits, initially as a raw material in the form of a peel oil, or an essence oil, or as aqueous essences. The substances are then concentrated further to increase their aromatic content and to separate undesirable substances. The raw materials are complicated mixtures of substances, some of which are very thermolabile, which must be considered as the carriers of the desirable aromatic nuances. The thermoability of the raw materials necessitates their storage only in a frozen state and necessitates shipping them from manufacturer to consumer, i.e. generally the fruit drink producer, in chains of freezers. This requirement is expensive and considerably increases the price of such drinks.

SUMMARY OF THE INVENTION

It is an object of the present invention to provide a peel oil concentrate which is stable in storage.

A further object of the present invention is to provide such a peel oil concentrate which is stable in storage and does not change or lose its aroma even if stored for long periods of time (several weeks to several months) at room temperature in pure form as well as in diluted form.

Another object of the present invention is to provide a natural citrus aroma concentrate which is stable in storage and does not change or lose its aroma even if stored for long periods of time (several weeks to several months) at room temperature.

Still another object of the present invention is to provide a process for producing a peel oil concentrate.

Additional objects and advantages of the present invention will be set forth in part in the description which follows and in part will be obvious from the description or can be learned by practice of the invention. The objects and advantages are achieved by means of the compositions, processes, instrumentalities and combinations particularly pointed out in the appended claims.

To achieve the foregoing objects and in accordance with its purpose, the present invention provides a citrus peel oil concentrate produced from cold-pressed citrus peel oil, the peel oil concentrate being obtained by subjecting the cold-pressed citrus peel oil to adsorption at a solid separating agent which adsorbs polar organic substances to thereby form an adsorbed fraction at the solid separating agent, eluting the adsorbed fraction with a polar organic eluant to form an eluate containing the adsorbed fraction, recovering the eluate, and separating the adsorbed fraction from the eluate.

In another embodiment of the present invention, the peel oil concentrate produced from cold-pressed citrus peel oil is obtained by extracting the cold-pressed citrus peel oil with a polar organic solvent to form a solvent extract phase and a raffinate phase, separating the solvent extract phase from the raffinate phase, and separating oil from the separated solvent extract phase.

The peel oil concentrate obtained by either of the above process can be used as a stabilizing agent for a natural citrus aroma concentrate. The natural citrus aroma concentrate can comprise a mixture of the peel oil concentrate and an essence oil concentrate, or a mixture of the peel oil concentrate and a concentrate of an aqueous essence, or a mixture of the peel oil concentrate, an essence oil concentrate and a concentrate of an aqueous essence. The natural citrus aroma concentrate retains its aroma and is stable in storage.

It is to be understood that both the foregoing general description and the following detailed description are exemplary, but are not restrictive of the invention.

DETAILED DESCRIPTION OF THE INVENTION

The present invention is based on the observation that peel oil contains substances which act as stabilizers. In the present invention, the peel oil is treated with the aid of suitable processes to form a peel oil concentrate which contains an enriched amount of the stabilizing substances. The thus obtained peel oil concentrate can be utilized as a stabilizing agent for natural citrus aroma concentrates.

To better understand the invention, a few definitions will now be listed:

1. "Peel oils" are understood to mean oils which are obtained in a cold way by pressing citrus fruit peel which has been freed from pulp.

2. "Essence oil" is understand to mean the oily phase which is obtained during condensation of the vapors escaping during concentration of citrus fruit juices.

3. "Aqueous essence" is understood to mean the aqueous phase which develops during the condensation of the vapors escaping during the concentration of citrus fruit juices.

4. "Citrus oil concentrate" or "natural citrus aroma concentrate" is understood to mean a mixture containing the peel oil concentrate of the present invention and at least one other concentrate such as an essential oil concentrate or concentrate of aqueous essence.

The problems with which the present invention is concerned generally exist in connection with all citrus fruit products, including in particular oranges, lemons, tangerines and grapefruit.

The manufacture of the peel oil concentrate is an important aspect of the present invention and results in a peel oil concentrate which is needed for the stability in storage of the above-mentioned citrus oil concentrate. In accordance with the present invention, it has been observed that the above-mentioned substances which act as stabilizers can be recovered from citrus peel oil concentrated or can be enriched therein, if the cold-pressed citrus peel oil is conducted, in a chromatographic column, through a solid separating agent which adsorbs polar organic substances to thereby form an adsorbed fraction at the solid separating agent. Active silica gel has been found to be particularly suitable as a solid separating agent. However, other correspondingly acting separating agents can also be used, for example, finely dispersed aluminum oxide. After transferring the starting peel oil to the chromatographic column and passing it through, the separating agent is washed with a small amount of nonpolar solvent, for example, petroleum ether. Then, the adsorbed fraction is eluated with a polar organic eluant, for example, ethanol, to form an eluate containing the adsorbed fraction. Other examples of suitable organic polar solvents are ethyl-acetate, ethyl-ether or acetone. The eluate is recovered or separated from the separating agent. The resulting recovered adsorbed fraction can then be separated from the eluate by, for example a saturated sodium chloride solution or by distillation. The so separated adsorbed fraction is the peel oil concentrate of the present invention.

Adsorption in the chromatographic separating column has been found most effective. However, in accordance with another embodiment of the present invention, it is also possible to enrich the desired substances by liquid extraction with a polar organic solvent. The term "polar organic solvent as used herein is understood to mean a single polar organic solvent which comprises a chemically uniform substance, and also mixtures of several polar organic solvents. Ethanol has been found to be particularly suitable for the implementation of this liquid extraction process. Other solvents are ethyl-acetate, methanol, n-propanol, i-propanol or propylen-glycol.

In the liquid extraction process the cold pressed citrus peel oil is extracted with the polar organic solvent to form a solvent extract phase and a raffinate phase. The solvent extract phase is then separated from the raffinate phase. The solvent extract phase contains the peel oil concentrate which is then separated from the solvent extract phase, by, for example, a saturated sodium chloride solution.

With the above-mentioned methods, the stabilizing substances which are contained in peel oils, i.e. tocopherols, carotinoides, lipoides, phosphorus lipides and similar group of substances, are enriched. Undesirable labile compounds of citrus products, such as monoterpenes and sesquiterpenes are separated to a substantial degree.

According to the present invention, the resulting peel oil concentrate is now mixed as required with essence oil concentrate, with concentrate of aqueous essence of with both to form a citrus oil concentrate. The quantity of peel oil concentrate to be used in the citrus oil concentrate depends on the degree of the desired stabilization as well as on the fact whether the flavor of the fruit peel is to be emphasized or not.

The citrus oil concentrates of the present invention have a great aroma imparting capability. Thus, 5 to 10 g of the citrus oil concentrate is sufficient to impart aroma to 100 l fruit drink.

A preferred composition of the citrus oil concentrate of the present invention comprises 10 to 90 percent by weight citrus peel oil concentrate obtained from cold-pressed citrus peel oil in the above-described manner, that is, by adsorption at said separating agents which adsorb polar organic substances or by extraction with polar liquid solvents. The remainder is essence oil concentrate.

Another preferred citrus oil concentrate composition according to the present invention includes 10 to 95% by weight citrus peel oil, produced in the above-described manner, the remainder concentrate of an aqueous essence.

A further preferred citrus oil concentrate composition according to the present invention includes 10 to 90 percent by weight citrus peel oil concentrate, produced in the above described manner, 5 to 85 percent by weight essence oil concentrate, and 5 to 85 percent by weight concentrate of an aqueous essence.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates the production of orange peel oil concentrate which is stable in storage and has a preservative effect.

A glass tube having a diameter of 13 mm and a length of 1000 mm was filled with 35 g active silica gel. 200 g cold-pressed California orange peel oil were conducted through the thus prepared separating column. After passage of the peel oil, the column was washed with 50 ml petroleum ether. The column was then eluated with 150 ml of concentrated ethanol containing 96 volume percent ethanol.

The resulting eluate was poured into 500 ml of a saturated aqueous sodium chloride solution which caused an oil to be separated. After settling, the oil phase was separated from the aqueous phase, and approximately 5 g orange peel oil concentrate was obtained as the oil phase.

The orange peel oil concentrate was analyzed and the following data were obtained:

Density (D) at 20° C. = 0.913 g/cm$^3$
Index of refraction ($n_D$) at 20° C. = 1.478
The composition of the orange peel oil concentrate was as follows:
31.8% aldehyde, calculated as decyl aldehyde
0.9% acid, calculated as acetic acid
16.6% ester, calculated as geranyl acetate
18.2% alcohol, calculated as linalool.
The orange peel oil concentrate was insoluble in 96% ethanol.

EXAMPLE 2

This example illustrates the production of grapefruit peel oil concentrate which is stable in storage and has a preservative effect.

A glass tube having a diameter of 13 mm and a length of 1000 mm was filled with 35 g active silica gel. 200 g of cold-pressed grapefruit peel oil were conducted through the thus prepared adsorption tube. After passage of the oil through the tube, the tube was washed with 50 ml petroleum ether. After drainage of the petroleum ether, the tube was eluated with 150 ml concentrated ethanol containing 96 volume percent ethanol. The resulting eluate was collected and the ethanol was distilled out from the eluate using a reduced pressure of approximately 20 mbar. Approximately 5 g grapefruit peel oil concentrate were obtained as distilled residue. The grapefruit peel oil concentrate was analyzed and the following data were obtained.

Data:
D 20° C. = 1.017
$n_D$ 20° C. = 1.52

The grapefruit peel oil concentrate was insoluble in 96% ethanol.

EXAMPLE 3

This example illustrates the production of lemon peel oil concentrate which is stable in storage and has a preservative effect.

200 g lemon peel oil, whch is a cold pressed lemon peel oil, were filled into a separating funnel having a volume of 500 ml. The oil was shaken out four times with ethanol. Each shaking employed 100 ml ethanol containing 73 percent by weight ethanol. The alcohol phase from each shaking was separated, and the so separated alcohol phases were combined with each other. The combined alcohol phases were stirred into 800 ml of a saturated sodium chloride solution, whereupon an oil separate. After settling of the oil, and washing twice with 50 ml water each time, 22 g of lemon peel oil concentrate were obtained.

The lemon peel oil concentrate was analyzed and the following data were obtained:
D 20° C.=0.860
$n_D 20°$ C.=1.477
Solubility in 90% ethanol 1:3 this means: One Vol. Part of oil is soluble in 3 Vol. Part of ethanol of 90 Vol %.

The composite in the lemon peel oil concentrate was as follows:
12.7% aldehyde, calculated as decyl aldehyde
0.15% acid, calculated as acetic acid
5.8% ester, calculated as geranyl acetate.

EXAMPLE 4

This example illustrates the production of an orange essence oil concentrate.

100 g orange essence oil were filled into a separating funnel having a volume of 200 ml. The oil was shaken out four times with ethanol. Each shaking employed 50 ml ethanol containing 62 percent by weight ethanol. The alcohol phase from each shaking was separated, and the so separated alcohol phases were combined with each other. The combined alcohol phases (extracts) were stirred into 500 ml saturated sodium chloride solution whereupon an oil separated. After the oil settled, it was recovered in a known manner in an amount of 6 g.

The so recovered orange essence oil concentrate was analyzed and the following data were obtained:
D 20° C.=0.857 g/cm$^3$
$n_D$ 20° C.=1.476
Solubility in 90% ethanol 1:1 this means: One Vol.-part of oil is soluble in 1 Vol.-part of ethanol of 90 Vol %.

The composition of the orange essence oil concentrate was as follows:
12.2% aldehyde, calculated as decyl aldehyde
0.1% acid, calculated as acetic acid
5.7% ester, calculated as geranyl acetate.

EXAMPLE 5

This example illustrates the production of a grapefruit essence oil concentrate. 500 g grapefruit essence oil were filled into a fractionating apparatus whose piston volume was 1000 ml, and which was provided with a fractionation attachment. Under reduced pressure of 20 mbar, and cooling of the apparatus with liquid nitrogen, distillation was initiated slowly by carefully raising the temperature. After 15 ml of distillate had been transferred, the distillation was terminated The distillate represented the desired grapefruit essence oil concentrate. It had the following data:
D 20° C=0.842
$n_D 20°$ C=1.4705
Solubility in 90% ethanol 1:6 that means: One Vol.-part of the oil is soluble in 6 Vol.-parts of ethanol of 90 Vol %.

The grapefruit essence oil concentrate had the following composition:
3.17% aldehyde, calculated as decyl aldehyde
0.02% acid, calculated as acetic acid
3.0% ester, calculated as geranyl acetate.

EXAMPLE 6

This example illustrates the production of a concentrate of aqueous orange essence.

500 g aqueous orange essence were filled into a fractionating apparatus having a piston volume of 1000 ml and a fractionating attachment. By slowly distilling out the fraction transferred up to 85° C., 30 ml distillate were obtained. The distillate was the desired concentrate of aqueous orange essence. It had the following data:
D 20° C.=0.813 g/cm$^3$
$n_D 20°$ C.=1.365
Solubility: clearly soluble in orange peel oil and water.

The concentrate of aqueous orange essence had the following composition:
5.6% aldehyde, calculated as decyl aldehyde
0.02% acid, calculated as acetic acid
0.46% ester, calculated as geranyl acetate.

EXAMPLE 7

To demonstrate keeping quality, the so-called "tocopheral test" was used. Tocopherol (vitamin E) is known to be an extremely thermolabile substance which is present in numerous fruits and also is citrus fruits. Tocopherol can be determined by thin-film chromatography. Prefabricated high resolution thin-film chromatography plates made by Merck, Darmstadt, were used to perform the comparison test selected here.

To perform the test, 20 $\mu$l of the substance to be examined were applied to the high resolution chromatographic thin-film plate. Chloroform was used as the mobile phase or fluxing agent which ascends the thin-film plate and effects the separation. After accomplishing the separation, the plate was sprayed with a solution of one part antimony pentachloride in four parts chloroform. The spot of tocopherol then became visible in a reddish brown color.

Samples of various substances were subjected to the tests immediately after being formed, and after storage at 20° C. for varying time periods. The results of the tests are set forth in the table below. The "+" designation indicates that tocopherol became visible in the test, whereas the "−" designation indicates that tocopheral did not become visible.

| Substance | Immediately | After 2 wks | 3 mos. | 6 mos. | 9 mos. |
|---|---|---|---|---|---|
| Fresh orange peel oil | + | − | − | − | − |
| Orange peel oil concentrate according to Example 1 | + | + | + | + | weak |
| Lemon peel oil | + | + | + | + | weak |

-continued

| Substance | Immediately | After | | | |
|---|---|---|---|---|---|
| | | 2 wks | 3 mos. | 6 mos. | 9 mos. |
| concentrate according to Example 3 | | | | | |

It will be understood that the above description of the present invention is susceptible to various modifications, changes and adaptations, and the same are intended to be comprehended within the meaning and range of equivalents of the appended claims.

What is claimed is:

1. Concentrate of natrual citrus oil which retains its aroma and is stable in storage, comprising:
   (a) 10 to 90 percent by weight citrus peel oil concentrate produced from cold-pressed citrus peel oil, the peel oil concentrate being obtained by extracting the cold-pressed citrus peel oil with a polar organic solvent to form a solvent extract phase and a raffinate phase, separating the solvent extract phase from the raffinate phase, and separating the peel oil concentrate from the separated solvent extract phase and
   (b) the remainder essence oil concentrate.

2. Concentrate of natural citrus oil which retains its aroma and is stable in storage, comprising:
   (a) 10 to 95 percent by weight citrus peel oil concentrate produced from cold-pressed citrus peel oil, the peel oil concentrate being obtained by extracting the cold-pressed citrus peel oil with a polar organic solvent to form a solvent extract phase and a raffinate phase, separating the solvent extract phase from the raffinate phase, and separating the peel oil concentrate from the separaed solvent extract phase and
   (b) remainder concentrate of an aqueous essence.

3. Concentrate of natural citrus oil which retains its aroma and is stable in storage, comprising:
   (a) 10 to 90 percent by weight citrus peel oil concentrate produced from cold-pressed citrus peel oil, the peel oil concentrate being obtained by extracting the cold-pressed citrus peel oil with a polar organic solvent to form a solvent extract phase and a raffinate phase, separating the solvent extract phase from the raffinate phase, and separating the peel oil concentrate from the separated solvent extract phase and
   (b) 5 to 85 percent by weight essence oil concentrate, and
   (c) 5 to 85 percent by weight concentrate of an aqueous essence.

4. A process for producing a concentrate of natural citrus oil which retains its aroma and is stable in storage comprising: forming a mixture containing 10 to 95 percent by weight citrus peel oil concentrate and the remainder being one or more ingredients selected from the group consisting of essence oil concentrate and concentrate of an aqueous essence, wherein the peel oil concentrate is obtained by extracting the cold-pressed citrus peel oil with a polar organic solvent to form a solvent extract phase and a raffinate phase, separating the solvent extract phase from the raffinate phase, and separating oil concentrate from the separated solvent extract phase.

* * * * *